US012584619B2

(12) United States Patent
He

(10) Patent No.: US 12,584,619 B2
(45) Date of Patent: Mar. 24, 2026

(54) ADHESIVE BACKED LED STRIP WITH RUBBER INSULATED WIRE

(71) Applicant: Shangyou Jiayi Lighting Product Co., LTD., Ganzhou (CN)

(72) Inventor: Yaowen He, Ganzhou (CN)

(73) Assignee: Shangyou Jiayi Lighting Product Co., LTD., Ganzhou (CN)

( * ) Notice: Subject to any disclaimer, the term of this patent is extended or adjusted under 35 U.S.C. 154(b) by 0 days.

(21) Appl. No.: 18/652,459

(22) Filed: May 1, 2024

(65) Prior Publication Data

US 2024/0369210 A1 Nov. 7, 2024

(30) Foreign Application Priority Data

May 4, 2023 (CN) ......................... 202321028631.5

(51) Int. Cl.

| | |
|---|---|
| ***F21V 23/00*** | (2015.01) |
| ***F21S 4/22*** | (2016.01) |
| ***F21S 4/24*** | (2016.01) |
| ***F21V 21/08*** | (2006.01) |
| ***F21Y 115/10*** | (2016.01) |

(52) U.S. Cl.

CPC .............. *F21V 23/001* (2013.01); *F21S 4/22* (2016.01); *F21S 4/24* (2016.01); *F21V 21/0808* (2013.01); *F21Y 2115/10* (2016.08)

(58) Field of Classification Search

CPC ............... F21V 23/001; F21V 21/0808; F21V 23/0808; F21S 4/28; F21S 4/10; F21S 4/22; F21S 4/24; F21Y 2115/10

See application file for complete search history.

(56) References Cited

U.S. PATENT DOCUMENTS

| | | | | |
|---|---|---|---|---|
| 4,761,720 A * | 8/1988 | Solow | ........................ | F21S 4/24 362/249.14 |
| 9,080,745 B2 * | 7/2015 | Quaal | ................... | F21V 23/005 |
| 9,803,852 B1 * | 10/2017 | Clacken | ............... | H04R 1/1058 |
| 11,421,834 B1 * | 8/2022 | Yin | ..................... | F21V 19/0035 |
| 2005/0092517 A1 * | 5/2005 | Fan | ........................... | F21S 4/24 174/117 FF |

(Continued)

FOREIGN PATENT DOCUMENTS

| | | |
|---|---|---|
| CN | 205746736 U | * 11/2016 |
| CN | 103499045 B | * 12/2016 |

(Continued)

*Primary Examiner* — Erin Kryukova

(57) ABSTRACT

An adhesive backed LED strip with a rubber insulated wire includes: a rubber insulated wire, n LED luminous bodies, and an adhesive backed layer, wherein the rubber insulated wire is flat, and includes a first flat plane and a second flat plane, and the rubber insulated wire is a rubber insulated wire from which rubber layers are removed in advance at a plurality of different positions; the rubber insulated wire electrically connects a first LED luminous body to an nth LED luminous body at the plurality of the positions; and the adhesive backed layer is disposed on at least one of the two flat planes. The adhesive backed LED strip with the rubber insulated wire according to the present disclosure is not only relatively simple in structure and easy to produce, but also relatively smooth in surface, making it convenient for winding arrangement of the LED strip.

2 Claims, 10 Drawing Sheets

(56) References Cited

U.S. PATENT DOCUMENTS

| | | | | |
|---|---|---|---|---|
| 2010/0157598 | A1* | 6/2010 | Tsai | F21V 21/002 362/382 |
| 2018/0294072 | A1* | 10/2018 | Lin | F21V 21/002 |
| 2020/0025360 | A1* | 1/2020 | He | F21V 23/002 |
| 2021/0107401 | A1* | 4/2021 | Ferrieres-Zhao | B32B 17/10302 |
| 2022/0082217 | A1* | 3/2022 | Shao | H10H 20/857 |
| 2022/0107082 | A1* | 4/2022 | Leung | H01B 13/32 |
| 2024/0142071 | A1* | 5/2024 | Li | F21V 33/0056 |

FOREIGN PATENT DOCUMENTS

| | | | | | |
|---|---|---|---|---|---|
| CN | 113944893 | A | * | 1/2022 | |
| EP | 4130552 | A1 | * | 2/2023 | F21K 9/20 |
| WO | WO-2016074886 | A1 | * | 5/2016 | F21S 4/10 |

* cited by examiner

ADHESIVE BACKED LED STRIP WITH RUBBER INSULATED WIRE

CROSS-REFERENCE TO RELATED APPLICATION

This application claims priority from the Chinese patent application 2023210286315 filed May 4, 2023, the content of which is incorporated herein in the entirety by reference.

TECHNICAL FIELD

The present disclosure relates to the field of LED strips, in particular to an adhesive backed LED strip with a rubber insulated wire.

BACKGROUND

Chinese patent document CN218820077U discloses a rubber-insulated wire lamp, and relates to the technical field of luminaires. The rubber-insulated wire lamp includes a lamp line, and a plurality of lamp beads electrically connected to the lamp line; a fixing assembly is detachably connected to the lamp line; the fixing assembly includes a fixing portion and a connecting portion; the fixing portion is detachably connected with the connecting portion; the fixing portion includes a plurality of fixed seats for allowing the lamp line to pass through; two sides of each fixed seat are provided with clamping lugs; each clamping lug is provided with a clamping block; the connecting portion includes a connecting seat and a light-transmitting cover; the connecting seat is connected with the light-transmitting cover; a surface of the light-transmitting cover is arranged in an arc surface; clamping holes opposite to the clamping blocks are formed in the connecting seat; and the light-transmitting cover can cover the lamp beads by clamping the clamping blocks to the clamping holes.

However, the structure of the LED strip disclosed by the above prior art is excessively complicated, which is not conducive to improving the production efficiency and improving the yield, and the surface of the entire strip is not sufficiently smooth and affects the efficiency of LED lamps.

In view of this, it is necessary to develop a new LED strip to solve the above technical problems.

SUMMARY

In view of this, the present disclosure provides an adhesive backed LED strip with a rubber insulated wire, including:

- a rubber insulated wire, n LED luminous bodies, and an adhesive backed layer, wherein
- the rubber insulated wire is flat, and includes a first flat plane and a second flat plane, and the rubber insulated wire is a rubber insulated wire from which rubber layers are removed in advance at a plurality of different positions;
- the rubber insulated wire electrically connects a first LED luminous body, a second LED luminous body, . . . , and an nth LED luminous body at the plurality of the positions; and
- the adhesive backed layer is disposed on at least one of the first flat plane and the second flat plane.

Preferably, for the adhesive backed LED strip with the rubber insulated wire, the adhesive backed layer is a somewhat transparent adhesive backed layer, or a completely opaque adhesive backed layer.

Preferably, for the adhesive backed LED strip with the rubber insulated wire, when the adhesive backed layer is a completely opaque adhesive backed layer, the adhesive backed layer is only disposed on one of the first flat plane and the second flat plane.

Preferably, for the adhesive backed LED strip with the rubber insulated wire, at least one wire in the rubber insulated wire serves as a signal wire to transmit a signal, wherein the signal is configured to control the brightness and flickering and color of each LED luminous body.

Preferably, for the adhesive backed LED strip with the rubber insulated wire, when the n LED luminous bodies are connected to a signal wire in parallel, the rubber insulated wire only includes one signal wire, and sequentially connects the n LED luminous bodies in a manner without being cut off, wherein the signal wire acts as a bus and transmits signals to control the brightness and flickering and color of each LED luminous body.

Preferably, for the adhesive backed LED strip with the rubber insulated wire, when the n LED luminous bodies are connected to a signal line in series, the signal wire in the rubber insulated wire is disconnected to a position where each LED luminous body is located, such that a portion of the signal wire that is disconnected is connected to a data input pin (DIN) of an ith LED luminous body, and another portion of the signal wire that is disconnected is connected to a data output pin (DOUT) of the ith LED luminous body and a data input pin (DIN) of an i+1th LED luminous body, wherein i is greater than or equal to 1, and i is less than or equal to n−1.

Preferably, for the adhesive backed LED strip with the rubber insulated wire, when the n LED luminous bodies are connected to a signal wire in parallel, the rubber insulated wire has only three wires, wherein one wire is used as a signal line to control each LED luminous body, and the other two wires are configured to supply power to each LED luminous body.

Preferably, for the adhesive backed LED strip with the rubber insulated wire, when the n LED luminous bodies are connected to a signal wire in series, the rubber insulated wire includes at least three wires.

Preferably, for the adhesive backed LED strip with the rubber insulated wire,

- each LED luminous body is covered with a fully transparent or translucent adhesive; and
- the LED luminous bodies covered with the adhesive may be attached to the adhesive backed layer or may separate the adhesive backed layers on both sides.

Preferably, for the adhesive backed LED strip with the rubber insulated wire, a portion of the wires other than the three wires is at least configured to lay out a line for continuous transmission of a signal at break points, the signal being configured to control the brightness and flickering and color of each LED luminous body; and

- another portion of the wires other than the three wires is at least also configured to connect other LED strips.

The present disclosure has the following beneficial effects:

In the present disclosure, the adhesive backed LED strip with the rubber insulated wire is achieved by using the rubber insulated wire from which the rubber layers are removed in advance at the plurality of different positions as a substrate, disposing corresponding LED luminous bodies at a plurality of positions, and disposing the adhesive backed layer on the substrate. Therefore, the adhesive backed LED strip with the rubber insulated wire is not only relatively simple in structure and easy to produce, but also relatively smooth in surface, making it convenient for winding arrangement of the LED strip. In addition, according to the adhesive backed LED strip with the rubber insulated wire of the present disclosure, the adhesive backed layer with a transparent effect can be further achieved, and there is not a negative impact on the lighting effect of the LED luminous bodies on the LED strip.

BRIEF DESCRIPTION OF FIGURES

In order to illustrate the technical solutions of the embodiments of the present disclosure more clearly, the drawings required to be used in the embodiments will be briefly described below, and it should be understood that the following drawings illustrate only certain embodiments of the present disclosure and therefore should not be regarded as limiting the scope, and that other related drawings can also be obtained from these drawings without inventive steps for those of ordinary skill in the art.

Figure 1:
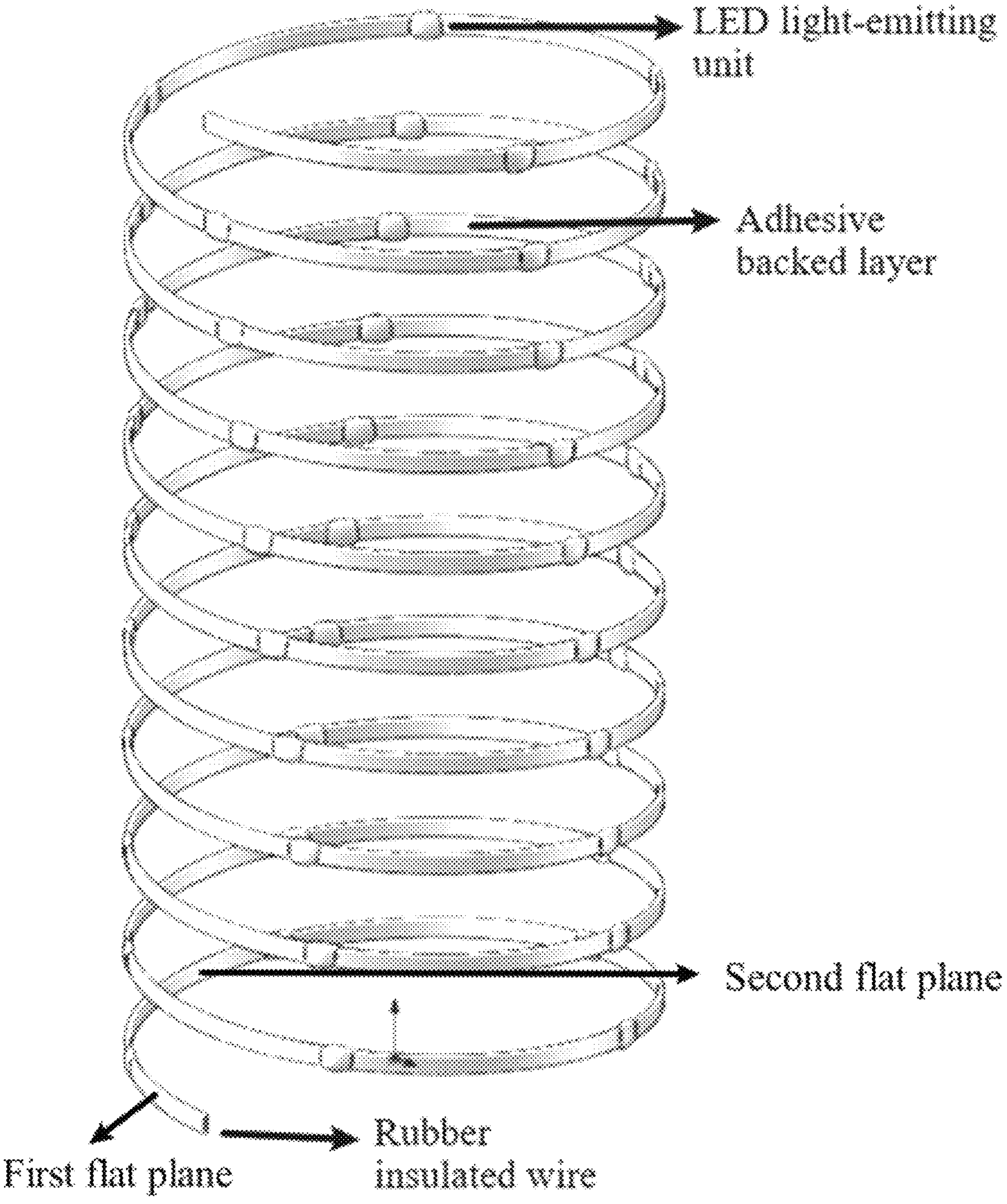
FIG. 1 is a structural schematic diagram of an adhesive backed LED strip with a rubber insulated wire according to an embodiment of the present disclosure.

It should be noted that the above drawings do not limit the dimensional proportions between parts, and the drawings are more illustrative of the structure and connection relationship, the spatial position relationship, and the like.

DETAILED DESCRIPTION

In order to make the objects, technical solutions and advantages of the embodiments of the present disclosure clearer, the technical solutions in the embodiments of the present disclosure will be clearly and completely described below with reference to the embodiments of the present disclosure and the accompanying drawings 1 to 14, and obviously, the described embodiments are some embodiments of the present disclosure, but not all of the embodiments. The components of the embodiments of the present disclosure generally described and illustrated in the drawings herein may be arranged and designed in a variety of different configurations.

Thus, the following detailed description of the embodiments of the present disclosure is not intended to limit the scope of the present disclosure claimed, but is merely representative of selected embodiments of the present disclosure. Based on the embodiments in the present disclosure, all other embodiments obtained by those of ordinary skill in the art without making inventive steps belong to the scope of protection of the present disclosure.

It should be noted that like reference numerals and letters represent like items in the following figures, and therefore, once an item is defined in one figure, it needs not be further defined and explained in the subsequent figures.

In the description of the present disclosure, it should be noted that the terms "upper", "lower", "inner", "outer" and the like, if present, indicate an orientation or positional relationship based on the orientation or positional relationship shown in the drawings, or the orientation or positional relationship in which a product of the present disclosure is conventionally placed during use, are merely for ease of description of the present disclosure and for simplicity of description, and are not intended to indicate or imply that the device or element referred to must have a particular orientation, and be constructed and operated in a particular orientation, and therefore cannot be construed as limiting the present disclosure.

In addition, the terms "first," "second," etc., if present, are used only to distinguish descriptions and are not to be construed as indicating or implying relative importance.

It should be noted that the features in the embodiments of the present disclosure may be combined with each other without conflict.

FIG. 1 shows one embodiment of an adhesive backed LED strip using a rubber insulated wire and capable of being in a spiral shape, including:

- a rubber insulated wire, n LED luminous bodies, and an adhesive backed layer, wherein
- the rubber insulated wire is flat, and includes a first flat plane and a second flat plane, and the rubber insulated wire is a rubber insulated wire from which rubber layers are removed in advance at a plurality of different positions;
- the rubber insulated wire electrically connects a first LED luminous body, a second LED luminous body, . . . , and an nth LED luminous body at the plurality of the positions; and
- the adhesive backed layer is disposed on at least one of the first flat plane and the second flat plane; and
- when the rubber insulated wire has a certain flexibility, the adhesive backed LED strip with the rubber insulated wire is easy to spiral.

For the above embodiment, it means that the LED strip is easy to wind and arrange, having the common characteristics of a general LED strip. Still further, the adhesive backed LED strip with the rubber insulated wire is achieved in the above embodiment by using the rubber insulated wire from which the rubber layers are removed in advance at the plurality of different positions as a substrate, disposing corresponding LED luminous bodies at a plurality of positions, and disposing the adhesive backed layer on the substrate. Therefore, the adhesive backed LED strip with the rubber insulated wire is not only relatively simple in structure and easy to produce, but also relatively smooth in surface, making it convenient for winding arrangement of the LED strip.

In another embodiment, for the adhesive backed LED strip with the rubber insulated wire, the adhesive backed layer is a somewhat transparent adhesive backed layer, or a completely opaque adhesive backed layer.

In another embodiment, for the adhesive backed LED strip with the rubber insulated wire, when the adhesive backed layer is a completely opaque adhesive backed layer, the adhesive backed layer is only disposed on one of the first flat plane and the second flat plane.

In another embodiment, for the adhesive backed LED strip with the rubber insulated wire, at least one wire in the rubber insulated wire serves as a signal wire to transmit a signal, wherein the signal is configured to control the brightness and flickering and color of each LED luminous body.

In another embodiment, for the adhesive backed LED strip with the rubber insulated wire, when the n LED luminous bodies are connected to a signal wire in parallel, the rubber insulated wire only includes one signal wire, and sequentially connects the n LED luminous bodies in a manner without being cut off, wherein the signal wire acts as a bus and transmits signals to control the brightness and flickering and color of each LED luminous body.

In another embodiment, for the adhesive backed LED strip with the rubber insulated wire, when the n LED luminous bodies are connected to a signal line in series, the signal wire in the rubber insulated wire is disconnected to a position where each LED luminous body is located, such that a portion of the signal wire that is disconnected is connected to a data input pin (DIN) of an ith LED luminous body, and another portion of the signal wire that is disconnected is connected to a data output pin (DOUT) of the ith LED luminous body and a data input pin (DIN) of an i+1th LED luminous body, wherein i is greater than or equal to 1, and i is less than or equal to n−1.

In another embodiment, for the adhesive backed LED strip with the rubber insulated wire, when the n LED luminous bodies are connected to a signal wire in parallel, the rubber insulated wire has only three wires, wherein one wire is used as a signal line to control each LED luminous body, and the other two wires are configured to supply power to each LED luminous body.

In another embodiment, for the adhesive backed LED strip with the rubber insulated wire, when the n LED luminous bodies are connected to a signal wire in series, the rubber insulated wire includes at least three wires.

In another embodiment, for the adhesive backed LED strip with the rubber insulated wire,

- each LED luminous body is covered with a fully transparent or translucent adhesive; and
- the LED luminous bodies covered with the adhesive may be attached to the adhesive backed layer or may separate the adhesive backed layers on both sides.

Still further, the LED luminous bodies covered with the adhesive may also be flush with the first flat plane and/or the second flat plane of the rubber insulated wire. Thus, in the present disclosure, the degree of smoothness and the degree of flatness of the LED strip can be further improved, improving the user experience when the LED strip is arranged.

In another embodiment, for the adhesive backed LED strip with the rubber insulated wire,

- a portion of the wires other than the three wires is at least configured to lay out a line for continuous transmission of a signal at break points, the signal being configured to control the brightness and flickering and color of each LED luminous body; and
- another portion of the wires other than the three wires is at least also configured to connect other LED strips.

Typically, the rubber insulated wire may include four wires insulated from each other, or even more wires insulated from each other before removing a rubber layer of an outermost layer of the rubber insulated wire and rubber layers of wires insulated from each other inside.

Figure 2A:
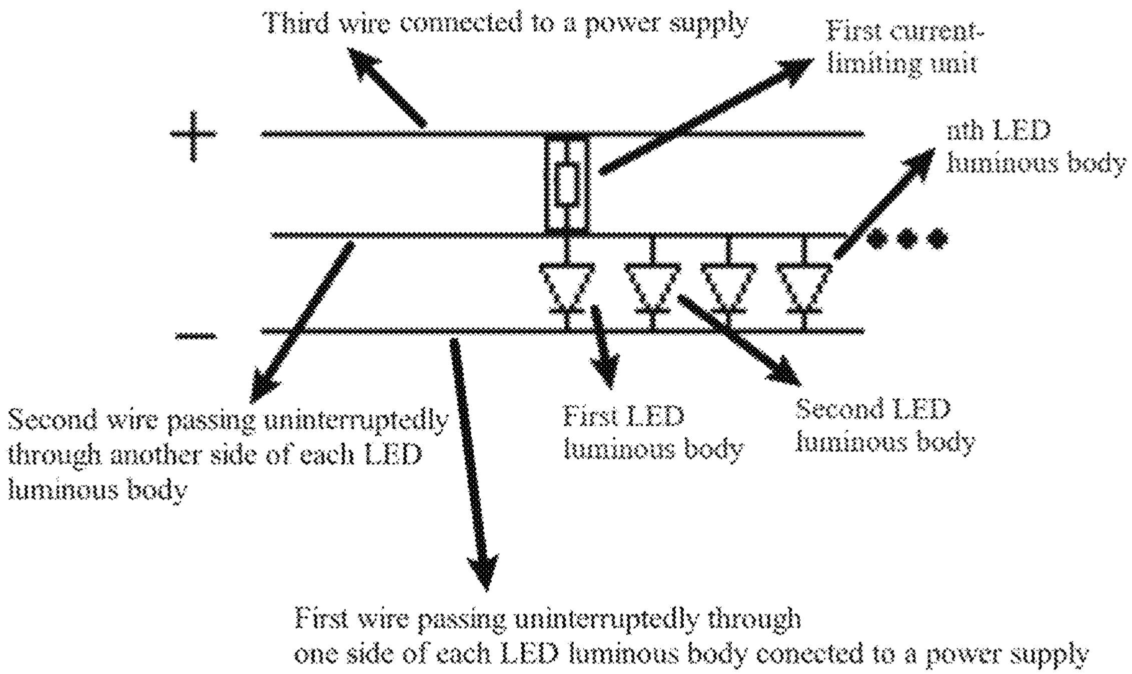
FIG. 2A is a schematic circuit diagram of the adhesive backed LED strip with the rubber insulated wire according to the embodiment of the present disclosure before an adhesive backed process is performed.

Referring to FIG. 2A, still further, in one embodiment, the present disclosure provides an at least three-wire adhesive backed LED strip with rubber insulated wires, including that:

- the rubber insulated wire is flat, and includes a first flat plane and a second flat plane, and the rubber insulated wire is a rubber insulated wire from which rubber layers are removed in advance at a plurality of different positions; and the rubber insulated wire includes a first wire, a second wire and a third wire;
- the adhesive backed layer is disposed on at least one of the first flat plane and the second flat plane; and
- the rubber insulated wire electrically connects a first LED luminous body to an nth LED luminous body which are in parallel with each other, and a first current-limiting unit at the plurality of the positions;

wherein n is greater than or equal to 2;

- one end of the first LED luminous body is connected to a first conductive point of the first wire, and the other end of the first LED luminous body is connected to a second conductive point of the second wire;
- one end of the first current-limiting unit is further connected to the second conductive point of the second wire, and the other end of the first current-limiting unit is connected to a third conductive point of the third wire; and
- the LED strip is only connected to a power supply through the first wire and the third wire.

For this embodiment, since only one current-limiting unit is used for the first LED luminous body to the nth LED luminous body, the above embodiment greatly reduces the amount of the current-limiting unit used. This not only reduces the cost, but also reduces the dependence on certain specific current-limiting units. This is of great significance for both high and low voltage LED solutions, particularly for high voltage LED solutions. For example, when only a very small number of high voltage LED chips are included in the LED luminous bodies, the LED strip still enables the LED luminous bodies to withstand a supply voltage and emit light even when connected to an external relatively high-voltage power supply, while the current-limiting unit further regulates a current flowing through the LED luminous bodies, which means that when the current flowing through the LED luminous bodies is very small, e.g., 0.6-0.8 mA, and at 110V, the LED luminous bodies are operated at a very low power and will not be burned.

In addition, since the first LED luminous body to the nth LED luminous body are in a parallel relationship, this means that the first LED luminous body to the nth LED luminous body can all be connected between the first wire and the second wire. In this case, when any LED luminous body fails, it is possible to easily cut out the faulty LED luminous body and always ensure that the remaining LED luminous bodies are still in a parallel relationship through continuous connection of the first wire and the second wire, thereby facilitating maintenance of the LED strip.

In another embodiment, the current-limiting unit includes any one of: a current-limiting IC, and a resistor.

More preferably, the current-limiting IC is a constant current IC.

It should be noted that when the current-limiting unit includes the current-limiting IC, this is of special significance for high-voltage power supply because when a plurality of LED luminous bodies are connected in parallel, each LED luminous body can have the same voltage, and the current and power of each LED luminous body are accurately controlled by limiting the current, thus having more advantages than the series high-voltage solution in the prior art, which can only accurately control the current. That is, the present disclosure can achieve a better LED lighting solution with high voltage, low power, low cost and precise control. Moreover, this helps to achieve a longer parallel LED lighting product, especially in the case of extremely small current limiting, as long as LEDs can still satisfy the visual brightness, a power of each circuit is relatively low due to the small current, a voltage of each parallel branch is satisfied to be equal under the premise of a certain total power, and on the premise that a total current of all branches is controlled by the current-limiting IC, the longer parallel LED lighting product can be achieved. It can be understood that when DC power supply is used, the first wire and the third wire may be power supply wires with a positive electrode and a negative electrode; and when AC power supply is used, the first wire and the third wire may be a neutral wire and a live wire.

In addition, it should be particularly emphasized that the current-limiting IC is preferably the constant current IC. Illustratively, the constant current IC provides 0.6-0.8 mA and at 110V, the LED luminous bodies are operated at a very low power and will not be burned. It can be understood that by configuring a certain number of LED chips, the product of the present disclosure can be operated at a voltage of 110V or the like without being burned, and it is beneficial to extend parallel LED lighting of a sufficient length. At 230V, a similar solution may be adopted.

In another embodiment, the first wire uninterruptedly passes through each side of the first LED luminous body to the nth LED luminous body;

- the second wire uninterruptedly passes through each side of the first LED luminous body to the nth LED luminous body; and
- the first wire is connected with a first conductive pin of the first LED luminous body; wherein a position connected with the first conductive pin is at the first conductive point of the first wire;
- the second wire is connected with a second conductive pin of the first LED luminous body; wherein a position connected with the second conductive pin is at the second conductive point of the second wire;
- and the first conductive point and the second conductive point are connected to the first conductive pin and the second conductive pin after soft insulating layers of the first wire and the second wire are removed in advance.

For this embodiment, since the first wire and the second wire uninterruptedly pass through both sides of each LED luminous body, and the first conductive point and the second conductive point are connected to the first conductive pin and the second conductive pin after the soft insulating layers of the first wire and the second wire are removed in advance, the first wire and the second wire in the above embodiment can be connected to the end without using two pre-cut wires to connect the corresponding LED luminous body at both sides of any LED luminous body, respectively. This is obviously beneficial to the improvement of the manufacturing efficiency: it is only necessary to prepare the first wire and the second wire which are long enough, remove the soft insulating layers at the corresponding conductive points in advance, and then connect the conductive points with the corresponding conductive pins of the LED luminous bodies, such as welding.

At this point, it can be understood that a manufacturing process for the adhesive backed LED strip with the rubber insulated wire according to the present disclosure mainly includes: peeling at different positions of the rubber insulated wire, tinning, patching the LED luminous bodies and the like at corresponding positions, welding, realizing the adhesive backed layer and curing.

Figure 2B:
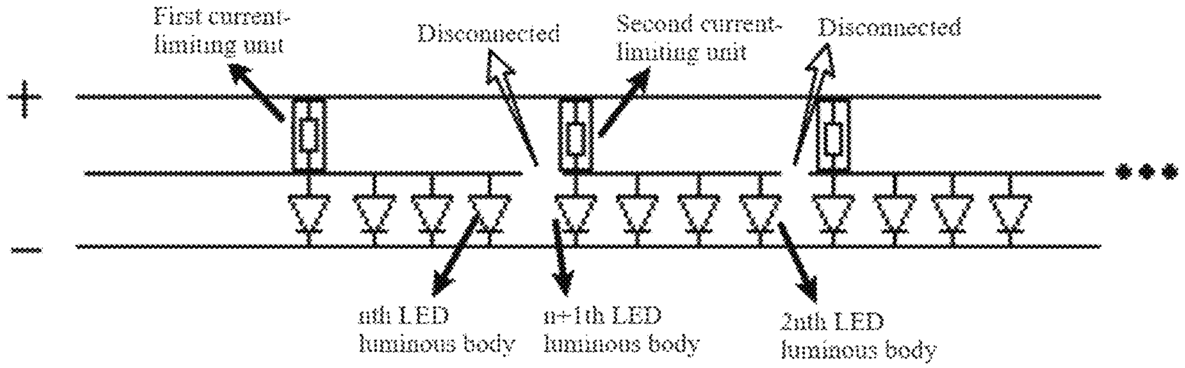
FIG. 2B is a schematic circuit diagram of the adhesive backed LED strip with the rubber insulated wire according to the embodiment of the present disclosure before an adhesive backed process is performed.

Referring to FIG. 2B, in another embodiment, the LED strip further includes an n+1th LED luminous body to a 2nth LED luminous body, and a second current-limiting unit;

- between the nth LED luminous body and the n+1th LED luminous body:
- the first wire is in an uninterrupted state;
- the second wire is in a disconnected state; and
- the third wire is in an uninterrupted state.

Thus, this embodiment achieves the effect of grouping all LED luminous bodies again according to different current-limiting units. Since the ability of a single current-limiting unit is limited after all, this embodiment can make a module have a sufficient length while still achieving the purpose of reducing the number of current-limiting units to a greater extent. Wherein the disconnected state of the second wire may be achieved by cutting a notch in the manufacture of the LED strip by a machine, the disconnection being clearly illustrated in FIG. 2B.

In another embodiment, the first conductive pin and the second conductive pin, the first conductive point and the second conductive point, the first current-limiting unit, and the first LED luminous body are all encapsulated in a package having a certain light transmittance.

It can be understood that this protects not only the relevant pins and conductive points, but also the current-limiting unit and the first LED luminous body, and the influence on light is avoided as much as possible. Having a certain light transmittance typically includes the following several situations: transparent, translucent, having a certain hazy effect, and the like.

In another embodiment, the rubber insulated wire is a flat wire, the first wire, the second wire and the third wire may have any of the following characteristics:

(1) the soft insulating layers of the first wire, the second wire, and the third wire adopt a rubber material or a PVC material;

(2) the first wire, the second wire and the third wire are connected to each other via a first connecting part and a second connecting part which have insulating characteristics; and (3) the first wire, the second wire, and the third wire are jointly coated with an insulating layer.

It can be understood that both the outdoor waterproof and anti-aging properties of the rubber material enable the LED strip to be used in harsher outdoor environments. The PVC material can also be used as a type of soft insulating layer. The soft insulating layer may be an insulating layer of a double-layer structure.

For this embodiment, there is a definite connection between the first wire, the second wire and the third wire. This can obviously improve the overall protective performance of the LED strip, making it less prone to tearing and breaking. The first wire, the second wire and the third wire are jointly coated with the insulating layer, and the wires can also be wires coated by an outer insulating layer, which also contributes to improving the overall protective performance of the LED strip, making it less prone to tearing and breaking.

In another embodiment, the first wire, the second wire and the third wire are substantially parallel to each other. It can be understood that this facilitates the removal of the soft insulating layers at the corresponding conductive points in advance, facilitating the positioning of the wires by a cutter or a manipulator or the like.

In another embodiment, the first conductive point, the second conductive point, and the third conductive point are formed by cutting the first wire, the second wire, and the third wire via a combined blade.

Typically, the first conductive point and the second conductive point are formed by cutting original insulating layers at certain points of the first wire and the second wire respectively by a first blade and a second blade in the combined blade; optionally, the combined blade may be two blades, and can also be combined with a positioning device, such as an optical or visual positioning device, to position the cutting position and drive a manipulator to drive the blades to a target position to cut the insulating layers. Further, the manipulator may further peel off peripheral insulating layers at the conductive points to facilitate the connection of the conductive pins of the LED luminous bodies to the conductive points.

It can be understood that in one LED luminous body, in addition to the conventional two conductive pins, two LED chips having a common positive electrode or a common negative electrode may involve a third conductive pin in a single LED luminous body. Even for one LED luminous body, taking more complex four conductive pins as an example, the combined blade can cut the corresponding insulating layers for multiple times at four different locations to form the connections of the first conductive pin, the second conductive pin, the third conductive pin and the fourth conductive pin. Further, in order to more accurately cut the wires to remove the insulating layers to expose the conductive points, optical or visual positioning devices combined with the AI technology may be used to perform accurate positioning and realize the cutting and peeling of the insulating layers.

In another embodiment, the package has at least one of the following characteristics:

(1) an exterior of the package can be sleeved with a shell molding with a shape or molded by injection molding;
(2) the package is encapsulated via glue; and
(3) the package is substantially spherical in structure.

In another embodiment, the LED strip has at least one of the following characteristics:

(1) the first LED luminous body and the second LED luminous body may be cut to be disconnected to facilitate the free cutting and use of the LED strip;
(2) the ith LED luminous body and the i+1th LED luminous body may be cut to be disconnected to facilitate the free cutting and use of the LED strip; and
(3) at least two LED chips in series are included inside the first LED luminous body to accurately control the current requirements of the LED luminous body while dividing a voltage.

It should be noted that this is of special significance when the LED strip further includes second LED luminous bodies in parallel, because when a plurality of LED luminous bodies connected in parallel are connected in the front and back, any LED luminous body can be freely cut to meet the length requirements of different scenes. Even if a certain LED luminous body fails, the faulty LED luminous body can be cut freely, and front and rear wires can be directly connected for convenient maintenance. As for the series connection of a plurality of LED chips inside the LED luminous bodies, it is to focus on accurately controlling the current requirements of the LED luminous bodies while dividing the voltage.

In fact, the above embodiment of the present disclosure prefers a solution in which a plurality of LED luminous bodies are connected in parallel. In the case of parallel connection, each LED luminous body can be freely cut, including cutting between the ith LED luminous body and the i+1th LED luminous body. After cutting, each LED luminous body can meet the supply voltage requirements when connected to a power supply, otherwise, even if a length is longer and there are more LED luminous bodies connected in parallel, the supply voltage requirements should not be met at the beginning, and the LED luminous bodies connected in parallel are burned directly. For example, in a scenario where AC power supply of 110V-230V is employed, each LED luminous body itself includes dozens of LED chips in series or in series and parallel to withstand an AC voltage of 110V or 230V. Even if a module of the LEDs of the present disclosure includes three LED luminous bodies, any one of the LED luminous bodies is cut out and connected to the AC voltage of 110V or 230V under the premise of preserving wires on both sides of the LED luminous body, as long as the LED luminous body itself is not faulty, a circuit can be formed to emit light. By contrast, obviously, the LED luminous bodies in series cannot achieve this because a plurality of LED luminous bodies in series can operate at 110 V or 230 V as a whole, and if one of the LED luminous bodies is directly cut to be connected to 110 V and 230 V, the LED luminous body will burn down with a high probability. It can be understood that in the present disclosure, the supply voltage is not limited to voltages such as 110V and 230V, and can be other power supply voltage standards or a wider range of voltages.

Thus, in parallel, the LED luminous bodies can be freely cut in the LED strip, and after cutting, each LED luminous body can meet the supply voltage requirements when connected to the power supply. In addition, under the condition that the LED luminous body fails, the faulty LED luminous body can be cut out freely, and original front and rear sections can be connected, the LED luminous bodies continue to operate under the same supply voltage in the case where the length loss is not large, and the brightness consistency between the LED luminous bodies can be maintained under the current operating situation.

In another embodiment, each LED luminous body is in the form of a patch. This is more beneficial to increase the manufacturing efficiency and guarantee the product performance.

In another embodiment, each LED luminous body is of a high-pressure type. This facilitates the manufacture of high-voltage parallel products.

In another embodiment, the present disclosure also provides an LED lamp, including:

an external package structure having a certain light transmittance; wherein the external package structure includes any one of the modules.

It can be understood that the LED strip of the present disclosure is packaged as a whole in the external package structure having the certain light transmittance as a packaging object. While the LED strip of the present disclosure can be manufactured very small, such an LED lamp has obvious significance. Exemplarily, packaging with a gel enables the LED lamp to have a certain light transmittance, e.g., full transparency, translucency, a certain haze effect, etc.

Figure 3:
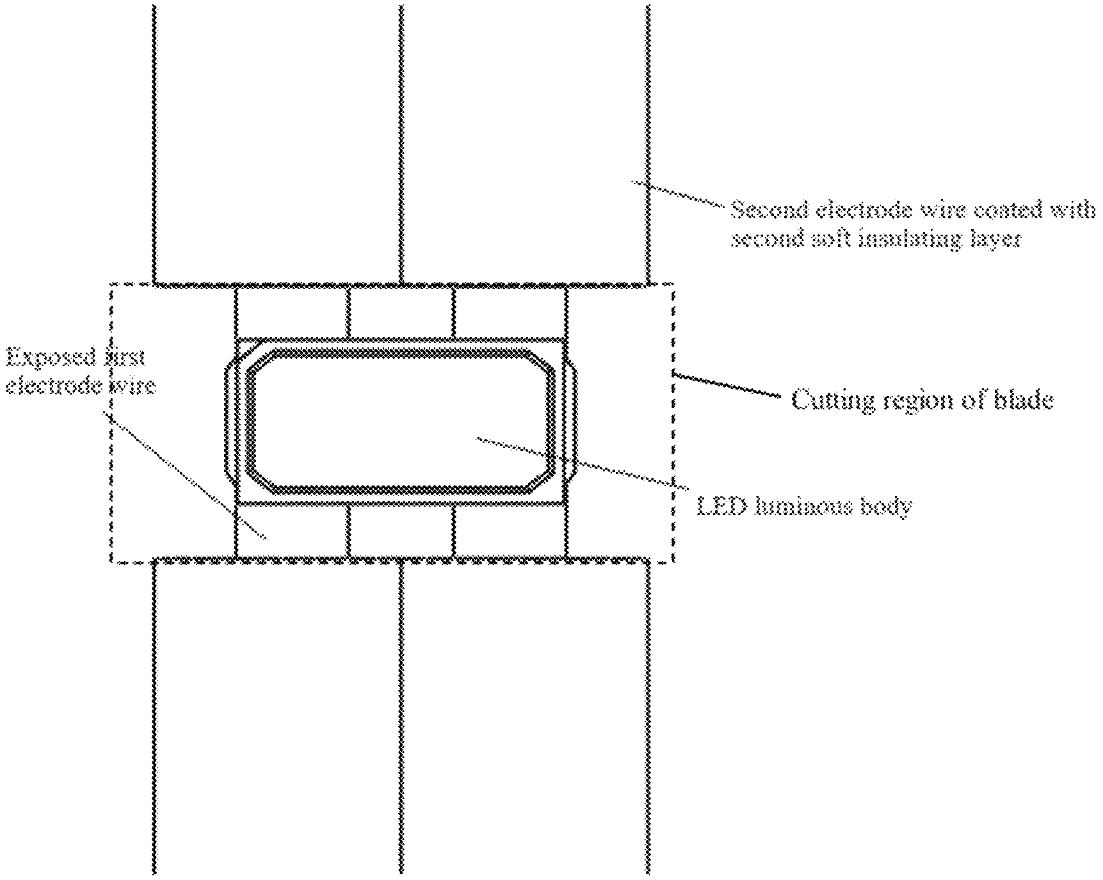
FIGS. 3-5 are enlarged schematic views of a partial structure of the adhesive backed LED strip with the rubber insulated wire according to the embodiment of the present disclosure before an adhesive backed process is performed.
Figure 4:
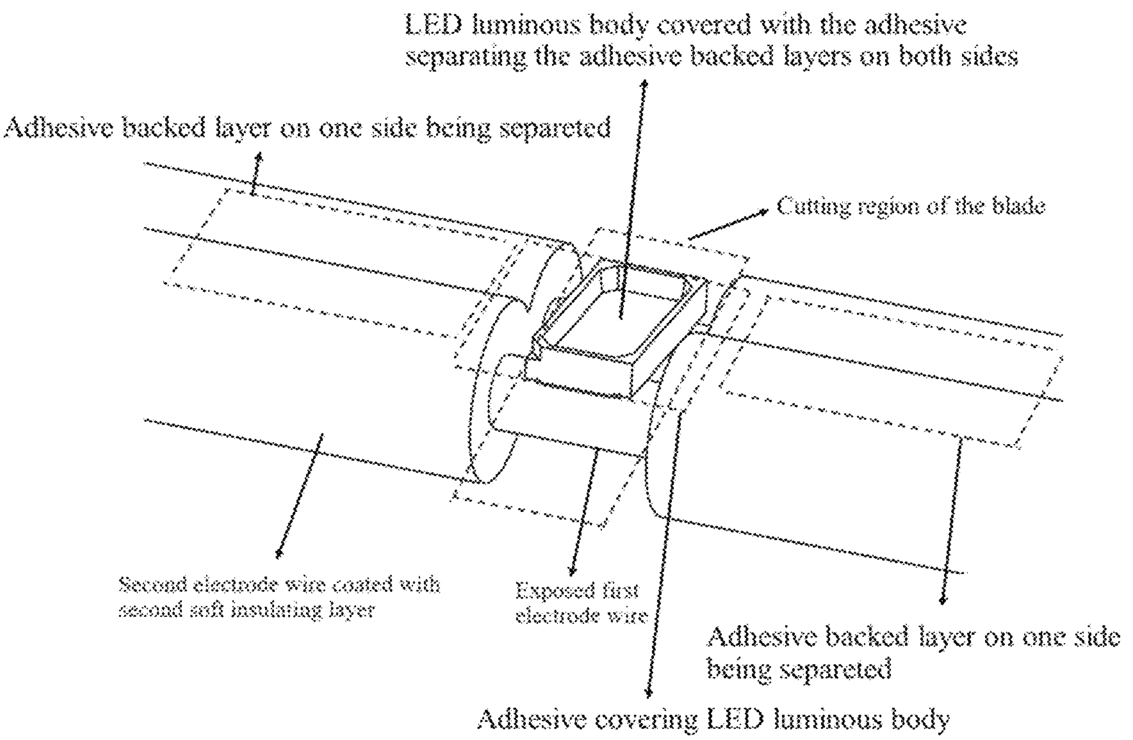
Figure 5:
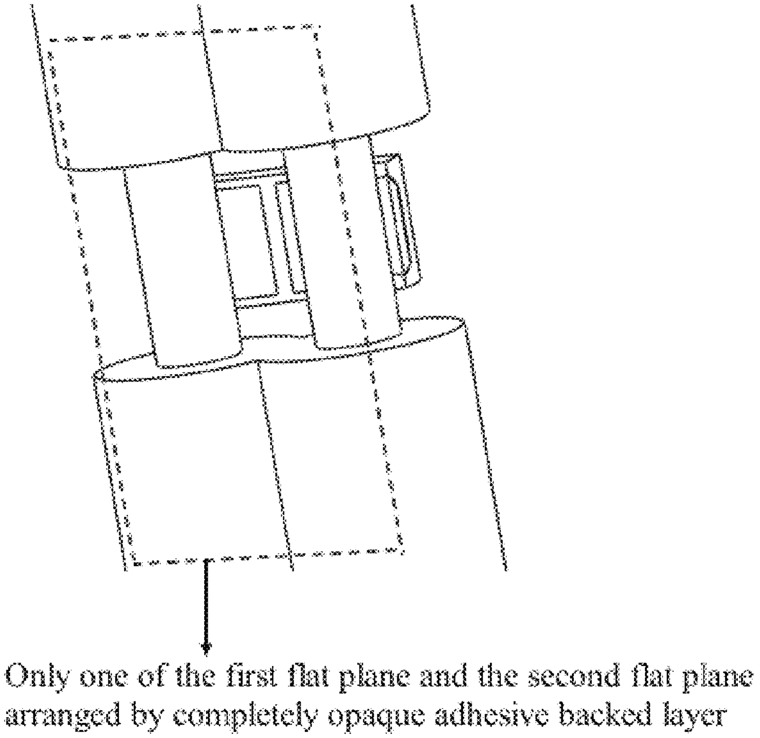

In another embodiment, as shown in FIG. 3, FIG. 4, and FIG. 5, an exposed first electrode wire, i.e., the first wire, formed in a cutting region of the rubber insulated wire by the blade, a second electrode wire, i.e., the second wire, coated with a second soft insulating layer in an uncut area, and the first LED luminous body are illustrated. It should be noted that by using the power carrier technology, two wires can realize power supply to the LED luminous bodies and the like, while transmitting signals to control the brightness, flickering and color and the like of the LED luminous bodies. That is, the LED strip disclosed in the present disclosure is not limited in that the rubber insulated wire must have at least three wires.

In another embodiment, the LED chips in the LED luminous bodies may also be high-voltage chips in series with non-high voltage common chips. Wherein the high-voltage chips in the first LED luminous body and the n+1th LED luminous body are further connected to first and second current-limiting ICs. It can be understood that the LED luminous body can be one high-voltage chip, a plurality of high-voltage chips, a plurality of low-voltage chips, a combination of high-voltage chips and low-voltage chips, or the like, mainly depending on how many volts of voltage and what cost requirements.

In another embodiment, the current-limiting unit may also not be packaged in one package together with the LED luminous bodies. For example, the first current-limiting unit is packaged separately, or the first current-limiting unit is packaged together with conductive points in its vicinity.

Figure 6:
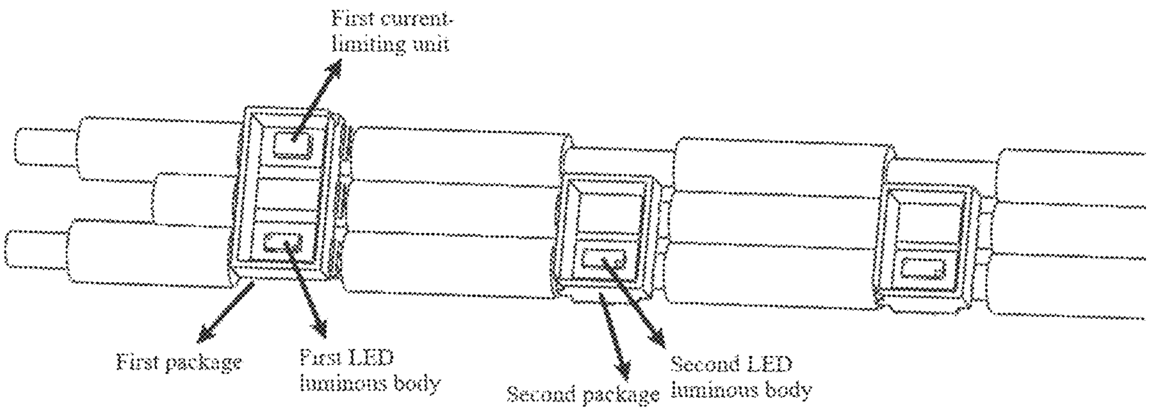
FIGS. 6-9 are structural schematic diagrams of the adhesive backed LED strip with the rubber insulated wire according to various embodiments of the present disclosure before an adhesive backed process is performed and after LED chips are packaged.
Figure 7:
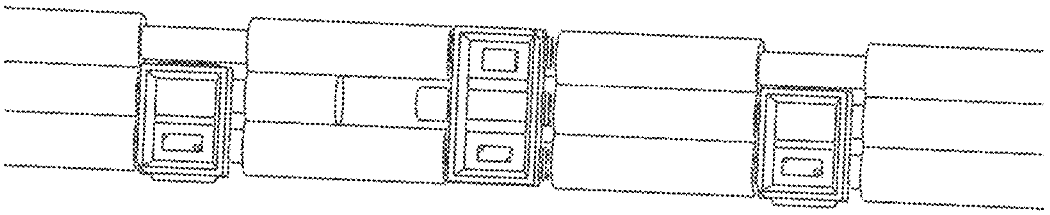

For the various packaging scenarios that may be involved in this embodiment and the previous embodiments, referring to FIGS. 6 to 9, where:

in FIG. 6, the first current-limiting unit is packaged together with the first LED luminous body; and in FIG. 7, it is shown that the current-limiting unit can be packaged together with the second LED luminous body. In connection with the foregoing, it can be understood that for a group of n LED luminous bodies in parallel, the current-limiting unit and any LED luminous body can be arranged together; and in FIG. 8, the current-limiting unit and nearby LED luminous bodies can be packaged separately; and in FIG. 9, it is shown that the current-limiting unit and any one of n LED luminous bodies connected in parallel can be arranged together and packaged separately as shown in FIG. 7. It can be understood that when arranged together and packaged separately from each other, the current-limiting unit and the LED luminous bodies are equivalent to: being separated from each other in substantially the same area, the LED luminous bodies being in an external relationship with respect to the current-limiting unit.

Figure 8:
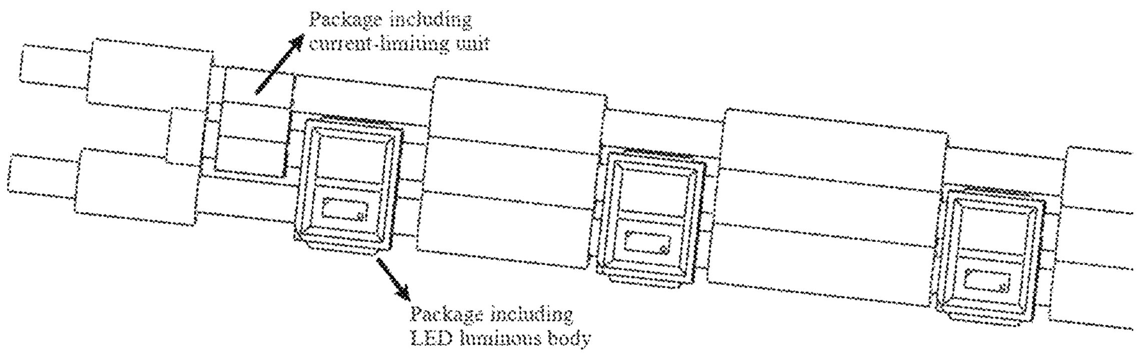
Figure 9:
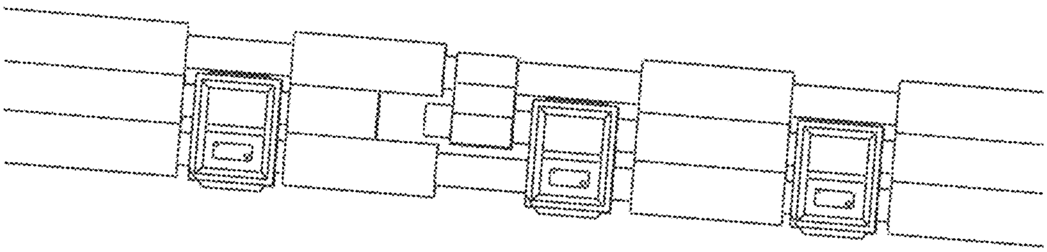

In another embodiment, in conjunction with FIGS. 8 and 9, for the separate package:

- a wire from the current-limiting unit to the first LED luminous body is connected to a separate bracket and further connected to a corresponding wire, and at this time, the LED luminous body is external.

In another embodiment, the LED chips in any LED luminous body are LED chips that are used as pixel dots to emit light.

Most typically, a strip lamp may be a point-controlled LED lamp at this time. The point-controlled LED lamp is particularly suitable for matching with a point-controlled IC, which is an IC with a current-limiting unit and a point-controlled capability combined. Typically, the point-controlled IC may also have the characteristics of the constant current IC. It should be particularly noted that the point-controlled LED lamp often needs an additional signal wire in addition to a neutral wire and a live wire or two DC power supply lines with a positive electrode and a negative electrode. Although signals can be transmitted on the power supply lines by using the two power supply lines and the power carrier technology, the present disclosure gives priority to a way of the additional signal wire. In addition, if the LED luminous body itself is composed of three RGB LED chips, for this embodiment, the present disclosure can also be implemented as a segment-controlled LED lamp.

Figure 10:
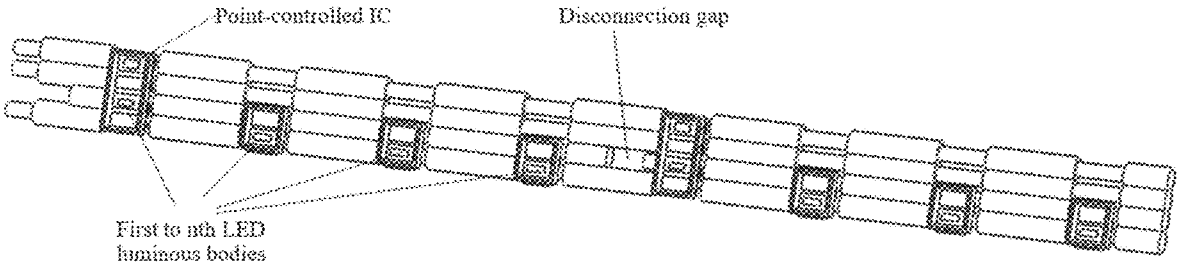
FIGS. 10-12 are structural schematic diagrams of a four-wire adhesive backed LED strip with rubber insulated wires before an adhesive backed process is performed according to various embodiments of the present disclosure.
Figure 11:
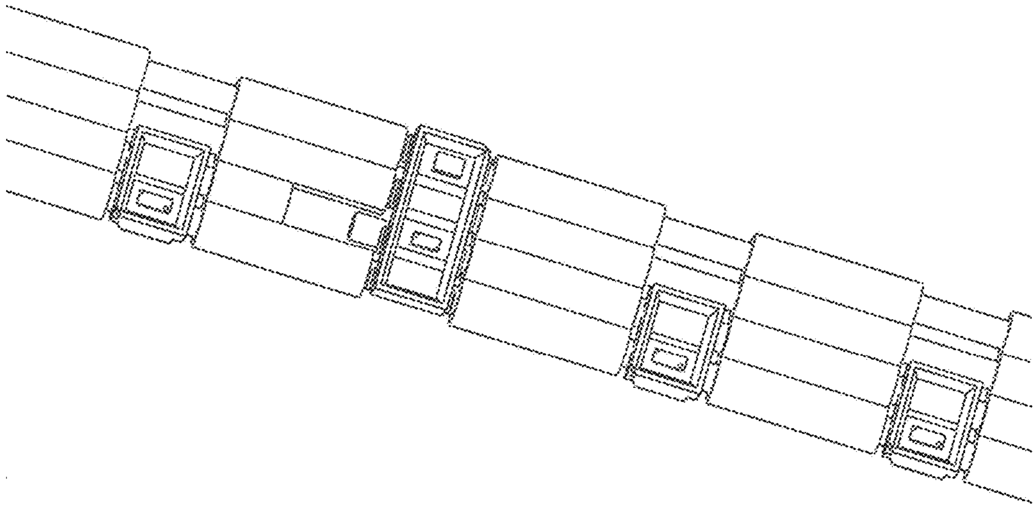
Figure 12:
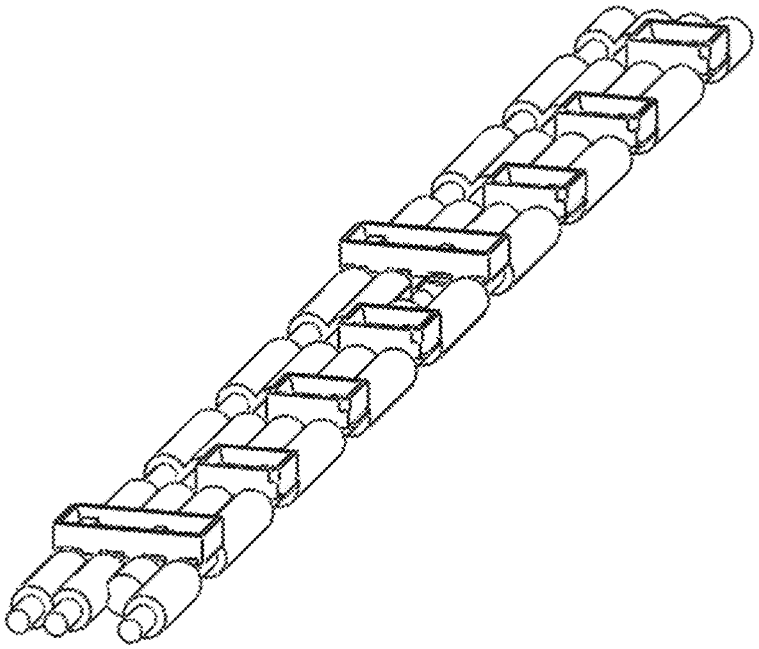

In another embodiment, the present disclosure also discloses a four-wire adhesive backed LED strip with rubber insulated wires. Referring to FIGS. 10 to 12, wherein FIG. 10 illustrates that for the four-wire adhesive backed LED strip with the rubber insulated wires, a total of n LED luminous bodies, first to nth, and their corresponding point-controlled ICs are in a group from left to right, and the two adjacent groups are still in a disconnected state at the second wire, wherein FIG. 10 clearly illustrates a disconnection gap at a disconnection so as to disconnect the second wire. It can be found that FIG. 10 also illustrates that the current-limiting unit is integrally packaged with the LED luminous bodies. It can be understood that the present disclosure is not limited to integrated packaging of the current-limiting unit and the LED luminous bodies, and the LED luminous bodies may include ordinary LED chips.

In connection with FIGS. 6 and 7, it should be noted that for the embodiments illustrated in FIGS. 6, 7, 10, and 11, if the current-limiting unit employs the current-limiting IC, the disconnection gap at the disconnection is very necessary, which can prevent an improper short circuit from causing relevant ICs to be damaged; and if the current-limiting unit uses a resistor, then the disconnection gap at the disconnection is not necessary.

FIG. 11 illustrates that in a group, not the point-controlled IC and the first LED luminous body must be arranged together.

FIG. 12 illustrates the four-wire LED strip at other viewing angles.

In addition, FIGS. 10 to 12 also illustrate different morphologies of the first electrode wire, i.e., the first wire, the second electrode wire, i.e., the second wire, and a third electrode wire, i.e., the third wire, in the cutting area and in the uncut area compared with FIGS. 3, 4 and 5.

In another embodiment, what needs to be more highlighted is that:

- for the LED strip, the LED luminous body (e.g., the first LED luminous body at a leftmost side shown in FIG. 10) that is arranged together with the point-controlled IC includes point-controlled LED chips. The remaining second to nth LED luminous bodies may then only be ordinary LED chips. Since the point-controlled IC is actually a specific implementation mode of the current-limiting unit described above, which is still in a series relationship with the n LED luminous bodies in parallel, taking the first LED luminous body as an example, the point-controlled capability can be achieved for the n LED luminous bodies in parallel by controlling the point-controlled LED chips in the first LED luminous body by the point-controlled IC.

In another embodiment, a wire from the point-controlled IC to the first LED luminous body is connected to a separate bracket and connected to a corresponding wire so that the LED luminous body is external with respect to the point-controlled IC.

Figure 13:
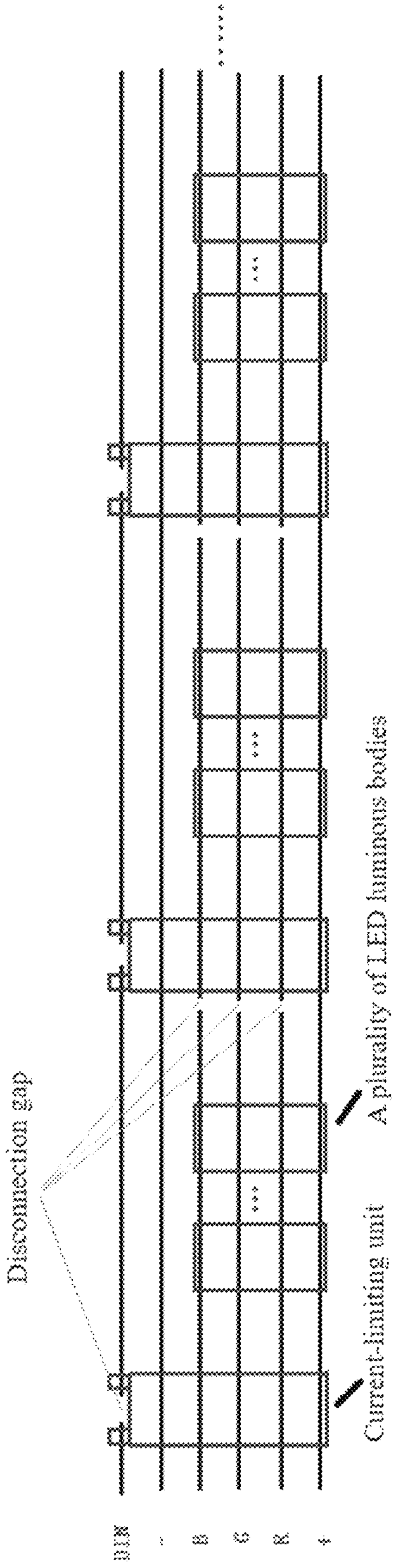
FIG. 13 is a circuit schematic diagram of a six-wire adhesive backed LED strip with rubber insulated wires according to one embodiment of the present disclosure.

Referring to FIG. 13, in another embodiment, a six-wire adhesive backed LED strip with rubber insulated wires is also disclosed, wherein for the LED strip, the six wires include a positive electrode wire and a negative electrode wire which use direct current power supply, and a signal wire DIN, and three wires R, G and B for connecting LED chips of R, G, and B, respectively. Thus, this embodiment achieves an RGB segment control through six wires, which can targetedly control three RGB lamp bead chips. As shown in FIG. 13, the current-limiting unit may include two terminals, and the two terminals are connected to the signal wire DIN, but there is a disconnection gap between the two terminals; and each current-limiting unit may form a group of units with a plurality of LED luminous bodies, and the three wires R, G and B are provided with disconnection gaps between each two adjacent groups of units. It can be understood that the current-limiting unit may also be changed to a package including a current-limiting unit, such as a segment-controlled IC.

Figure 14:
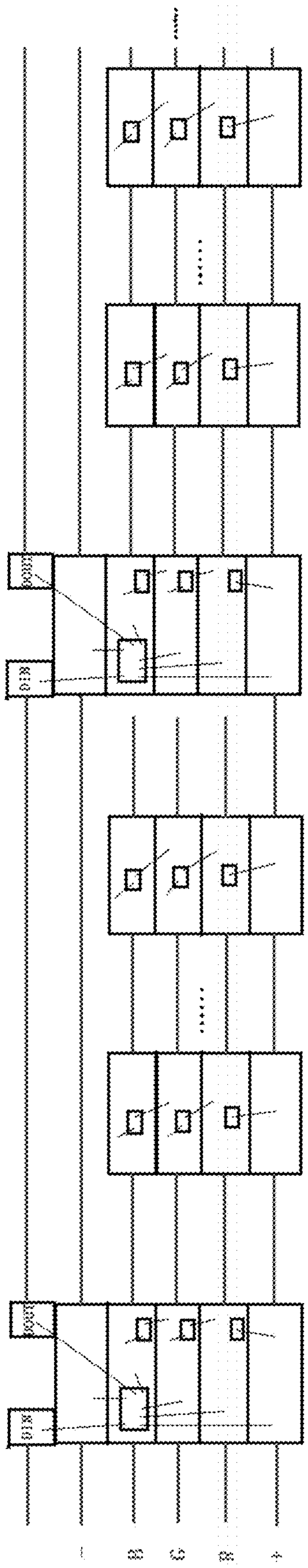
FIG. 14 is a schematic circuit diagram of a six-wire adhesive backed LED strip with rubber insulated wires according to another embodiment of the present disclosure.

With further reference to FIG. 14, in another embodiment, the current-limiting unit and three LED chips of R, G, and B are further disclosed. Wherein the current-limiting unit obviously encapsulates the IC, and each current-limiting unit involves two terminals for connection to a DIN line, including a DIN terminal used as a signal input of the current current-limiting unit and a DOUT terminal used as an output, so as to continue transmitting signals to the subsequent current-limiting unit.

In another embodiment, further, when the rubber insulated wire includes at least three wires, each LED luminous body itself may also integrate an LED driving chip in addition to including the LED chips, wherein the LED driving chips themselves between the plurality of the LED luminous bodies may be in a parallel relationship or in a series relationship at a signal level. Taking the condition that the rubber insulated wire includes three wires and only one wire is a signal wire as an example, wherein:

when the plurality of the LED luminous bodies are in a parallel relationship with each other, the LED chips include, for example, three-color R, G, and B LED chips, and a specified address code is burned for each LED chip. At this time, a signal input DIN may take only one consecutive signal wire to connect the LED luminous bodies in the form of a bus, for example, the signal wire is connected to the LED chips via the LED driving chips. In this case, the detailed package structure includes the following characteristics: for a plurality of LED luminous bodies of which signals are connected in parallel, any one LED luminous body receives the signal input DIN through the signal wire, and the signal input DIN is further transmitted to the LED driving chip, and the LED driving chip does not need to output signals to other LED luminous bodies; and when the plurality of the LED luminous bodies are in a serial relationship with each other, there is no need to burn a specified address code for the three-color R, G, and B LED chips in any one LED luminous body. The signal wire is divided into a signal input wire and a signal output wire, exemplarily, when a signal is transmitted to one LED luminous body each time, the LED driving chip of the LED luminous body directly reads the DIN signal transmitted, reads only the first few bits of the DIN signal, and outputs the remaining DIN signal in the form of a DOUT signal to a subsequent LED luminous body of which an LED driving chip is processed in a similar manner as a previous LED driving chip in addition to the first few bits of the DIN signal. Therefore, in this case, it is not necessary to burn a specified address code for each LED luminous body, and at this time, the detailed package structure includes the following characteristics: when the plurality of the LED luminous bodies are LED luminous bodies with signals in series, any one LED luminous body receives the signal input DIN through a portion of the cut signal wire and is further connected to an LED driving chip, and the LED driving chip sends a signal output DOUT to the corresponding LED driving chips of other LED luminous bodies through another portion of the cut signal wire.

The above are only the specific embodiments of the present disclosure, but the protection scope of the present disclosure is not limited thereto. Any change or replacement that can be easily thought of by a skilled person familiar with the technical field within the technical scope disclosed in the present disclosure should be covered within the scope of protection of the present disclosure. Therefore, the protection scope of the present disclosure should be subject to the protection scope of the claims.

What is claimed is:

1. An adhesive backed LED strip with a rubber insulated wire, comprising:

the rubber insulated wire, n LED luminous bodies, and an adhesive backed layer, wherein the rubber insulated wire is flat, and comprises a first flat plane and a second flat plane, and the rubber insulated wire is a rubber insulated wire from which rubber layers are removed at a plurality of different positions, and the rubber insulated wire from which rubber layers are removed acts as a substrate, corresponding LED luminous bodies are disposed at the plurality of the different positions, and the adhesive backed layer is disposed on the substrate; the rubber insulated wire has a first wire, formed in a cutting region of the rubber insulated wire cut by a blade, a second wire, coated with a second insulating layer in an uncut area, and a third wire in a cutting area cut by the blade;

wherein a first conductive point of the first wire is connected with a first conductive pin of a first LED luminous body;

a second conductive point of the second wire is connected with a second conductive pin of the first LED luminous body; and the first conductive point and the second conductive point are connected to the first conductive pin and the second conductive pin after insulating layers of the first wire and the second wire are removed; the first wire and the second wire uninterruptedly pass through one side and another side of each LED luminous body;

the rubber insulated wire electrically connects n LED luminous bodies including a first LED luminous body, a second LED luminous body up to an nth LED luminous body at the plurality of the positions, wherein n is greater than or equal to 2; one end of the first LED luminous body is connected at the first conductive point of the first wire, and the other end of the first LED luminous body is connected at the second conductive point of the second wire; the rubber insulated wire electrically connects the first LED luminous body to the nth LED luminous body which are in parallel with each other, and only a first current-limiting unit is used for the first LED luminous body to the nth LED luminous body, wherein one end of the first current-limiting unit is connected at the second conductive point of the second wire, and the other end of the first current-limiting unit is connected at a third conductive point of the third wire, and wherein the first current-limiting unit comprises any one of: a current-limiting IC, and a resistor;

the adhesive backed layer is disposed on only one of the first flat plane and the second flat plane; and the n LED luminous bodies are covered with a fully transparent or translucent adhesive and are attached to the adhesive backed layer;

the adhesive backed LED strip is only connected to a power supply through the first wire and the third wire;

the adhesive backed layer is a completely opaque adhesive backed layer; and the each LED luminous body of the n LED luminous bodies is covered with the fully transparent or translucent adhesive.

2. The adhesive backed LED strip with the rubber insulated wire according to claim 1, wherein at least one wire in the rubber insulated wire serves as a signal wire to transmit a signal, wherein the signal is configured to control the brightness and flickering and color of each LED luminous body.

* * * * *